United States Patent [19]
Dalzell et al.

[11] Patent Number: 5,805,336
[45] Date of Patent: Sep. 8, 1998

[54] OPTICAL LENS BLANK WITH POLARIZER ALIGNED BETWEEN PLASTIC BIREFRINGENT SHEETS

[75] Inventors: William H. Dalzell, Marshfield; Igor Loshak, Cambridge, both of Mass.

[73] Assignee: Polaroid Corporation, Cambridge, Mass.

[21] Appl. No.: 628,781

[22] Filed: Apr. 5, 1996

[51] Int. Cl.⁶ ..................................................... G02B 5/30
[52] U.S. Cl. ......................... 359/494; 359/485; 359/493; 359/497; 65/37; 264/1.32
[58] Field of Search .................................. 359/483, 485, 359/490, 491, 493, 494, 497, 614; 65/37, 38; 264/1.31, 1.32; 351/49; 425/808

[56] References Cited

U.S. PATENT DOCUMENTS

| | | | |
|---|---|---|---|
| 2,263,249 | 11/1941 | Rogers | 88/65 |
| 2,320,375 | 6/1943 | Moulton | 88/65 |
| 2,387,308 | 10/1945 | Styll | 88/65 |
| 3,560,076 | 2/1971 | Ceppi | 359/491 |
| 3,711,417 | 1/1973 | Schuler | 252/300 |
| 3,786,110 | 1/1974 | Ortlieb | 264/2 |
| 5,327,180 | 7/1994 | Hester, III et al. | 351/165 |
| 5,412,505 | 5/1995 | Van Ligten et al. | 359/483 |
| 5,434,707 | 7/1995 | Dalzell et al. | 359/485 |

FOREIGN PATENT DOCUMENTS

| 1080678 | 6/1954 | France | 2/12 |
|---|---|---|---|

*Primary Examiner*—Paul M. Dzierzynski
*Assistant Examiner*—Darren E. Schuberg
*Attorney, Agent, or Firm*—Louis G. Xiarhos

[57] ABSTRACT

A thermoformed plastic laminar light-polarizing composite lens blank is produced from a laminate comprising a light-polarizing layer between polymeric layers. The absorption axis of the light-polarizing layer of the laminate is aligned to substantial parallelism with a principal index of refraction of the polymeric layer which forms the convex surface of the lens blank and which is birefringent, thereby to minimize retardation effects of the birefringent material on plane polarized light. The polymeric layer which forms the concave surface of the lens blank is substantially thicker than the opposed polymeric layer in order to accommodate grinding of the surface thereof to an ophthalmic prescription. Thermoforming of unitary portions cut from a supply of the laminate is performed under heat and pressure.

20 Claims, 5 Drawing Sheets

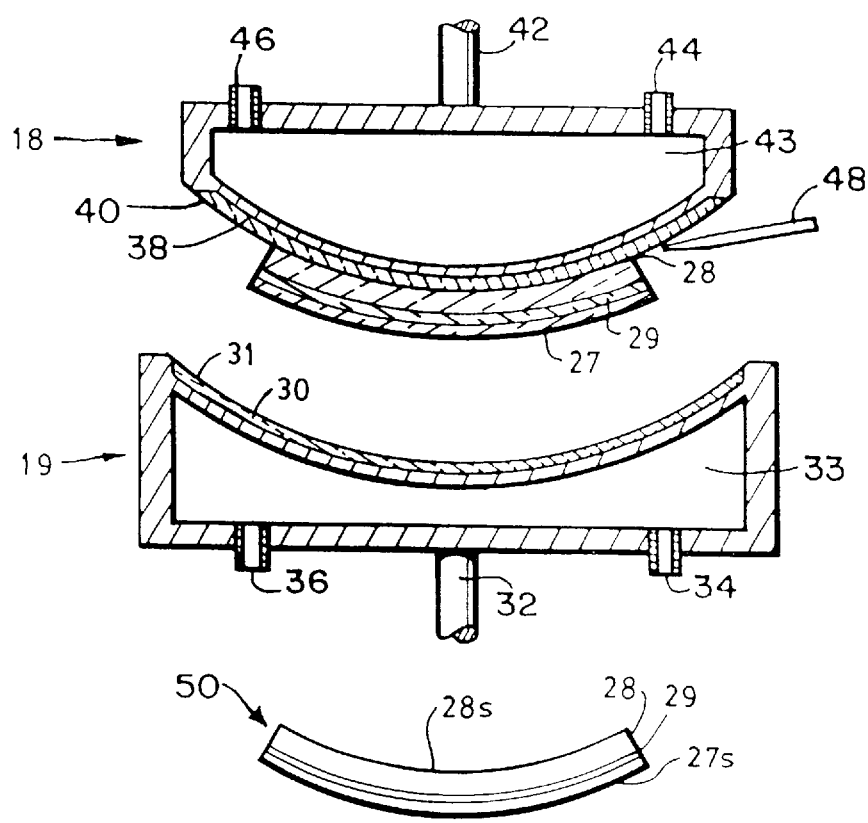

OPTICAL LENS BLANK WITH POLARIZER ALIGNED BETWEEN PLASTIC BIREFRINGENT SHEETS

CROSS-REFERENCE TO RELATED APPLICATION

In the application of William H. Dalzell and Igor Loshak for "LAMINAR LIGHT-POLARIZING LENS BLANK FOR PRODUCING PRESCRIPTION LENS", U.S. patent application Ser. No. 08/628,780 filed of even date, there are disclosed and claimed a curved composite lens blank for the production of a light-polarizing optical lens, and a method of preparing same, wherein unitary portions of a laminate comprising a light polarizing layer between a pair of light-transmissive polymeric sheets are cut from a supply of the laminate, placed between heated platens, thermoformed under heat and pressure to a curved lens blank and removed from between the platens. At least the one of said pair of sheets which forms the convex surface of the curved composite lens blank comprises a polymeric sheet which is isotropic, i.e., which exhibits an optical retardance of 20 nanometers or less.

BACKGROUND OF THE INVENTION

This invention relates to a plastic laminar light-polarizing composite lens blank useful in the production of a plastic light-polarizing lens. More particularly, it relates to a shaped (curved) lens blank having a light-polarizing layer laminated between a pair of polymeric light-transmissive layers and to a method of making the lens blank, the lens blank being useful in the production of an optical lens having good polarizing efficiency.

Curved light-polarizing lenses useful in spectacles and optical instruments, and having a layer of molecularly oriented light-polarizing material between a pair of substrate sheets or plates, have been known. Curved light-polarizing lenses are described, for example, in U.S. Pat. No. 2,263,249 (issued Nov. 18, 1941 to H. G. Rogers); U.S. Pat. No. 2,320,375 (issued Jun. 1, 1943 to H. R. Moulton); U.S. Pat. No. 2,387,308 (issued Oct. 23, 1945 to H. H. Styll); U.S. Pat. No. 3,560,076 (issued Feb. 2, 1971 to F. G. Ceppi); U.S. Pat. No. 3,711,417 (issued Jan. 16, 1973 to N. W. Schuler); U.S. Pat. No. 3,786,119 (issued Jan. 15, 1974 to C. Ortlieb); and U.S. Pat. No. 5,327,180 (issued Jul. 5, 1994 to W. F. Hester, III); and U.S. Pat. No. 5,434,707, (issued Jul. 18, 1995 to W. H. Dalzell, et al.).

Typically, curved light-polarizing optical lenses of the types described in the aforementioned United States patents include the light-polarizing layer between inner and outer layers of light-transmissive material which serve to define the light-refracting surfaces of the lens. In the case of lenses for use in spectacles, those layers nearest and furthest, respectively, from the eye of the wearer define the concave and convex light-refracting surfaces of the lens. The inner and outer lens elements of a composite lens having a light-polarizing material element therebetween can be produced by resort to certain known methodologies.

Thus, a pre-formed polarizer can be laminated to one or more supporting sheets of flat or curved glass, as is described in the aforementioned U.S. Pat. No. 2,263,249. Layers of light-transmitting glass or plastic synthetic material can be assembled with a light polarizer therebetween and heat laminated in a press having the desired curvature for the making of curved lenses, as is described in the aforementioned U.S. Pat. No. 2,320,375. The production of curved polarizing lenses substantially free of haze and cosmetic defects is described in the aforementioned U.S. Pat. No. 3,560,076. In the aforementioned U.S. Pat. No. 5,327,180, a polarizing lens is prepared by preparing lens elements of suitable material (e.g., by grinding), cleaning the lens elements thoroughly and laminating the elements with a light-polarizing film disposed therebetween.

Alternatively, a curved light-polarizing lens can be made by placing a light polarizer in a mold having surfaces of desired curvature and filling the mold with fluid glass, as is disclosed in the aforementioned U.S. Pat. No. 2,387,308. The mold surfaces can be predetermined to provide the refractive power desired in the finished lens which is removed from the mold after hardening of the fluid glass. In each of the aforementioned U.S. Pat. Nos. 3,711,417 and 3,786,119, the production of a curved lens having a light polarizer between surfaces of polymerized monomer is described. In each case, a mold having predetermined shaping surfaces and a polarizer disposed therebetween is filled with polymerizable monomer. The resulting plastic lens blank removed from the mold after polymerization of the monomer is shaped or ground to desired power.

It will be appreciated that there will be considerable interest in plastic light-polarizing lens blanks (and finished lenses) which have good light-polarizing efficiency, durability and abrasion resistance and which can be manufactured by resort to simple and efficient methodology. Moreover, it will be beneficial, particularly in the case of lens blanks for the production of prescription (e.g., vision-correcting) ophthalmic lenses, that the curvatures of the lens blank surfaces correspond at least approximately to those needed to provide the predetermined prescriptive properties of a finished lens. It will be appreciated that production of a composite lens blank by a process which requires that separate inner and outer lens elements be first ground and polished and, then, bonded (laminated) together with a preformed (curved) light polarizer therebetween will be a tedious, labor-intensive and inefficient process. Similarly, production of a lens blank by resort to a method which requires the preforming of a curved light polarizer, placement of the polarizer into a mold, filling of the mold with polymerizable monomer, curing (polymerization) of the monomer and release of the curved blank or lens from the mold will be labor intensive, time-consuming and inefficient.

The ease with which a light-polarizing lens can be prepared from a lens blank, and particularly the optical properties of the lens, will be influenced by the nature of the materials (and the process steps) used in the production of the lens. For example, glass is an optically isotropic material which by reason of its non-rotatory affect on polarized light is especially adapted to utilization in optical devices which include a light polarizer. Glass is not, however, adapted readily to convenient forming (e.g., thermoforming or bending) methods. Moreover, depending upon the particular materials utilized, the forming method may induce strain and orientation in the light-polarizing layer or the light-transmissive layers of the lens blank, manifested by optical distortion and reduced polarizer efficiency. Depending upon the nature of polymerizable monomer used in a method based upon in situ polymerization in a mold, shrinkage of the cured resin and the development of physical strains can result in reduced polarizer efficiency. Apart from considerations which relate particularly to prescription lenses, it will oftentimes be important that lenses intended for sunglass applications have good durability and abrasion resistance so as to withstand the conditions of use and abuse encountered frequently in the case of sunglasses.

SUMMARY OF THE INVENTION

It has been found that a curved composite lens blank, suited to the production therefrom of a light-polarizing lens having good light-polarizing efficiency, durability and abrasion resistance, can be prepared in a simple and efficient manner from low-cost birefringent light-transmissive lens-forming materials configured in proper relation to a light-polarizing layer.

In accordance with an article aspect of the invention, there is provided a unitary laminar curved composite lens blank for the production of a light-polarizing optical lens, the lens blank comprising in order:

a first light-transmissive birefringent polymeric layer;

a light-polarizing layer;

and a second light-transmissive polymeric layer;

said first light-transmissive layer defining a convex surface of said lens blank and being a thin layer relative to said second light-transmissive layer;

said second light-transmissive layer defining a concave surface of the lens blank and being substantially thicker than the first light-transmissive layer and having a thickness sufficient to permit grinding of the concave surface thereof for production of optical properties desired in said light-polarizing optical lens;

said convex surface of said unitary laminar curved composite lens blank providing at least substantially the optical properties desired in said light-polarizing optical lens and said concave surface thereof being grindable to a surface providing said light-polarizing optical lens with said desired optical properties;

said light-polarizing layer and at least the first of said first and second light-transmissive layers being aligned such that a principal index of refraction direction of the light-transmissive layer is in substantial parallelism with the light absorption axis of the light-polarizing layer;

In a method aspect, the present invention provides a method of preparing a lens blank or a ground lens therefrom which comprises the steps of:

providing a supply of a laminar composite structure, said laminar composite structure comprising, in order and in superposed relation, a first light-transmissive birefringent polymeric layer, a light-polarizing layer, and a second light-transmissive polymeric layer, said first light-transmissive layer being a thin layer relative to said second light-transmissive layer, said second light-transmissive layer being substantially thicker than said first light-transmissive layer and having a thickness sufficient to permit the grinding of material therefrom in the optical grinding of a concave surface of a lens to be formed from said laminar composite structure, said light-polarizing layer and at least the first of said first and second light-transmissive layers being aligned such that a principal index of refraction direction of the light-transmissive layer is in substantial parallelism with the light-absorption axis of the light-polarizing layer:

cutting and removing from said supply of said laminar composite structure a unitary portion of a size sufficient for the production therefrom of a curved lens;

placing said unitary portion between opposed concave and convex platens, with the first light-transmissive layer of said portion positioned for shaping by said concave platen;

heating and pressing said platens together, said pressing being sufficient to shape said unitary portion into a curved lens having a convex surface defined by the first light-transmissive layer thereof and a concave surface defined by the second light-transmissive layer thereof, each said surface having a radius of curvature corresponding substantially to the radius of curvature of the respective platen forming said surface; and removing said curved lens from between said platens.

For a fuller understanding of the nature and objects of the invention, reference should be made to the following description taken in conjunction with the accompanying drawings.

BRIEF DESCRIPTION OF THE DRAWINGS

FIG. 10 is a cross-sectional view of the apparatus of FIG. 7, showing a further lens-blank removal step of the method of the invention; and FIG. 11 is a side elevation of a preferred embodiment of a completed plastic light-polarizing lens blank of the invention from which a finished (ground) optical lens can be prepared.

DETAILED DESCRIPTION OF THE INVENTION

Figure 1:
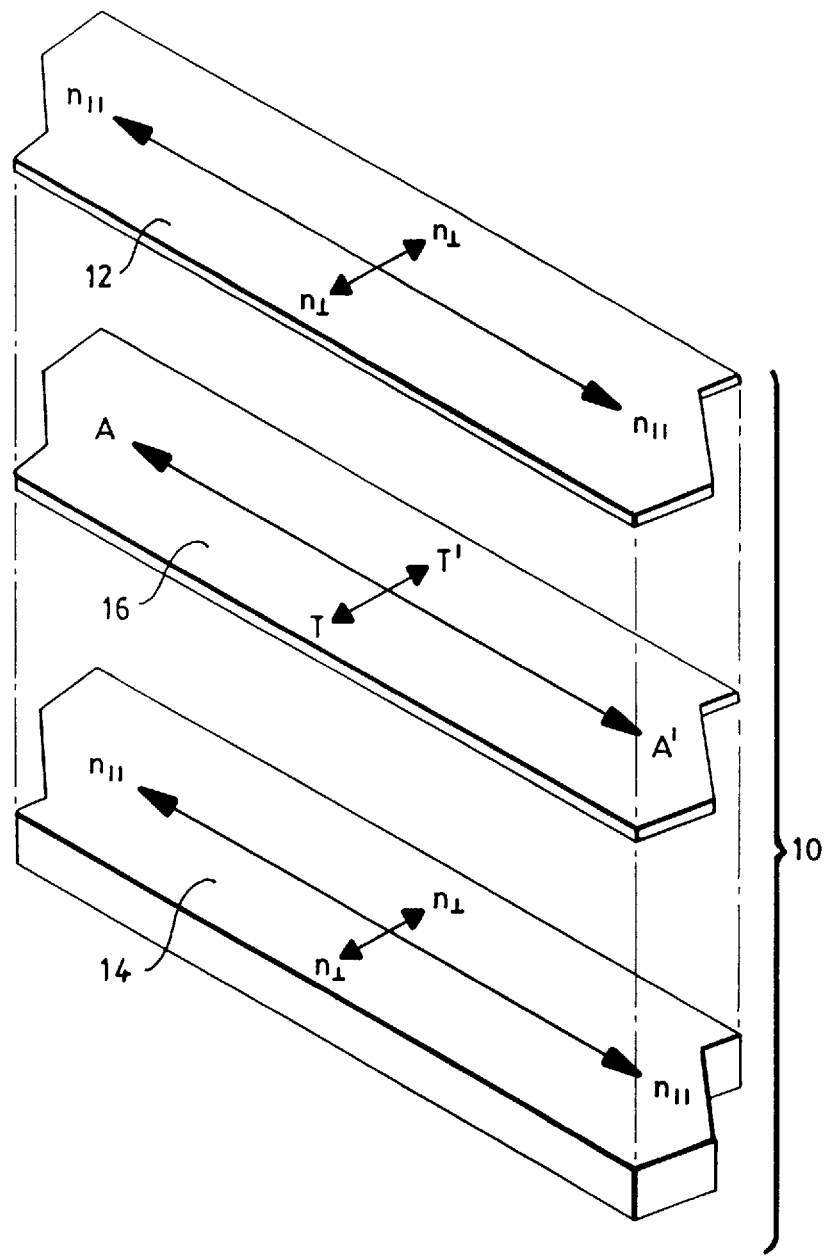
FIG. 1 is an isometric view showing in exploded relation the respective layers of a plastic composite light-polarizing laminate comprising a light polarizer between thermoformable light-transmissive sheets, from which composite laminate a light-polarizing ophthalmic lens blank of the invention can be formed.

As mentioned previously, the present invention is directed to a plastic light-polarizing lens blank which can be produced in a simple and efficient manner from relatively low-cost polymeric sheet materials and which can be used to provide optical lenses having efficient light-polarizing properties. The manner in which these realizations are accomplished will be dependent upon the utilization of particular materials in proper relation to one another, i.e., in prescribed order and arrangement, as will become apparent from the detailed description provided hereinafter.

As used herein, a lens "blank" refers to a curved (convexoconcave) unitary laminate comprising a light polarizer between light-transmissive polymeric layers of the character aforedescribed and of a size and shape from which an optical lens having desired optical properties can be made by edge grinding and, usually, optical grinding and polishing of the concave surface of the lens blank. Optical grinding of the concave surface can be used to adapt the lens blank to the optical properties desired in a "finished" lens which can be used in optical equipment, or in the case of ophthalmic lenses, for the production of zero-power or vision-correcting lenses. In general, it will be convenient, in order to accommodate a range of ophthalmic lens prescriptions, to prepare a "family" or series of ophthalmic lens blanks, the members of which have a convex surface (surface 27s shown in FIG. 11) formed to a spherical curvature of, for example, two, four, six or nine Diopters. The radii of curvature of the lens-forming surfaces of the platens needed to form the respective lens blanks can be determined by resort to known principles of physics and optics. The curved lens blanks can be spherical, aspherical, toroidal, lenticular, monofocal or multifocal and can be of zero power or vision correcting. By selecting a particular lens blank from the series (or "family") of blanks, a particular prescription can be filled by optical grinding (surfacing) of the concave surface (surface 28s shown in FIG. 11) of the blank to the particular radius of curvature, calculated on the basis of the following formula (I) for the ophthalmic power (P) of the lens:

$$P = P_1 - P_2 + \frac{P_1 P_2 T}{n} \quad (I)$$

wherein T is the lens thickness; n is the refractive index of the lens material; $P_1$ is the power of the convex surface (base curve); and $P_2$ is the power of the concave surface. Respective surface powers are calculated using the formulas (II and III):

$$P_1 = \frac{(n-1)}{R_1} ; \quad (II)$$

and $$P_2 = \frac{(n-1)}{R_2} \quad (III)$$

wherein each of $R_1$ and $R_2$ is a radius of curvature and n is the index of refraction of the lens material. Knowing the prescribed lens power, convex radius of the blank and the refractive index of the lens material, and designating the center thickness of the finished lens, the radius of curvature of the concave surface can be calculated in known manner. Using conventional finishing operations, e.g., polishing and edge grinding, a "finished" optical lens, suited for insertion into an optical apparatus or into an eyeglass frame, can be prepared.

Referring now to FIG. 1, there are shown in exploded fashion the layers (sheets) 12, 14 and 16 which comprise the components of a laminar composite structure 10 from which unitary portions can be removed for shaping into a light-polarizing optical lens blank. Laminar composite 10 includes a light-polarizing layer 16 laminated between first (12) and second (14) light-transmissive polymeric layers or sheets. Light-polarizing layer or sheet 16 comprises a molecularly oriented light-polarizing material which provides the light-polarizing functionality of the lens blank of the invention.

Linear light polarizers, in general, owe their properties of passing radiation selectively along a given electromagnetic radiation vector (while adsorbing electromagnetic radiation vibrating along a second given electromagnetic vector) to the anisotropic character of the transmitting medium. Dichroic polarizers are linear polarizers of the absorptive variety; that is, they owe their light-polarizing properties to the vectorial anisotropy of the polarizer medium. Light entering a dichroic medium encounters two different absorption coefficients, one low and one high. The emerging light vibrates predominately in the direction of low absorption.

Shown in FIG. 1 is the absorption axis (line A–A') of light polarizer 16; the transmission axis of the polarizer is shown therein as line T–T'. Typically, as is the case in the preferred composite laminate 10, the absorption axis of light polarizer 16 will be along the machine direction, i.e., the direction in which the polarizer product flows as the result of the process (and particularly the direction of materials-orienting steps) used for manufacture. Correspondingly, the transmission axis of the light polarizer is typically along the transverse direction of the polarizer. The relation of these axes, and the absorption axis in particular, to a principal index of refraction of at least light-transmissive layer (sheet) 12 will be important and is described in greater detail hereinafter.

In general, useful materials for light polarizer 16 will include linear molecularly oriented dichroic light-polarizing materials. Such materials are known and, typically, have a thickness in the range of about 0.1 to 3 mils (about 0.0025 to 0.076 mm.). A preferred material to serve as light polarizer 16 is a layer of stretched (oriented) polyvinyl alcohol of about one-mil thickness (0.025 mm.) stained according to known methods with a dichroic dye such as iodine. Such a polarizing material will also be preferably borated for improved stability. Suitable polarizing layers of this type can be prepared utilizing methods set forth in U.S. Reissue Pat. Re. 23,297 and in U.S. Pat. No. 4,166,871. Another preferred polarizing material is a stretched polyvinyl alcohol (PVA) sheet containing polyvinylene light-polarizing species such as may be provided by hydrochloric acid vapor processing in known manner. Preferably, such polarizing material will be borated for improved stability. Suitable light-polarizing materials of such type can be prepared in the manner described in U.S. Pat. No. 2,445,555. Other light-polarizing materials can, however, be employed and methods for their production can be found in U.S. Pat. Nos. 2,237,567; 2,527,400; and 2,554,850.

In the production of light polarizers, one or more support or carrier sheets can be employed to improve the durability and handling characteristics of the light-polarizing material. Preferably, the support sheet(s) will comprise material which is optically isotropic or nearly so, in order to avoid or minimize optical light rotation effects on polarized light transmitted by light polarizer 16. Support sheets of cellulose acetate, cellulose acetate-butyrate (CAB) or other polymeric material can be used for this purpose. Good results in the production of the plastic lens blanks hereof can be obtained using a layer of PVA-based light-polarizing material sandwiched between a pair of cellulose triacetate (CTA) films. A preferred light polarizer 16 comprises a layer of PVA-based light-polarizing material having a thickness of about 0.5 to 1.5 mil (0.013 to 0.038 mm.) sandwiched between a pair of cellulose triacetate sheets (not shown), each of the sheets having a thickness in the range of about 1 to 5 mils (0.025 to 0.127 mm.). An adhesive can be used to promote desired bonding without forming bubbles, haze or other visible defects. Suitable adhesives will be known to those skilled in the art.

Layers (or sheets) 12 and 14 comprise thermoplastic materials, i.e., polymeric materials which can be formed or shaped by the influences of temperature and pressure. A variety of light-transmissive thermoplastic materials can be employed, including acrylic materials (e.g., polyacrylates such as polymethylmethacrylate), polystyrenes and polycarbonates. Light-transmissive polymeric sheet materials which can be thermoformed and which exhibit good durability can be employed to advantage. Polymeric sheet materials which exhibit birefringence, and which by reason of such property may cause depolarization of plane polarized light directed therethrough, can be used by observance of the alignment relationships specified hereinbefore. Polymeric materials produced by mass production methods incorporating extrusion, stretching and like molecule-orienting influences on processed materials are exemplary of materials which exhibit intrinsically a level of birefringence that may be considered to render such materials of limited usefulness in optical applications requiring proximity of the materials to a light polarizer. The polyacrylates prepared by uniaxial extrusion methodologies include low-cost and commercially available materials which can be used in the light-polarizing composite laminate 10 from which optical lens blanks having good light-polarizing properties can be produced, provided there is observance of the aforedescribed alignment relationships.

Good results can be obtained using sheets 12 and 14 of polymethylmethacrylate. In general, polymethylmethacrylate resins exhibit good durability, transparency and processability. The beneficial attributes and limitations of polymethylmethacrylate and others of the aforementioned materials, insofar as their adaptability to the production of optical elements is concerned, are known and described, for example, in U.S. Pat. Nos. 4,986,648 (issued Jan. 22, 1991 to A. Kobayashi) and 5,043,405 (issued Aug. 27, 1991 to T. Koseki). Homopolymers of methyl methacrylate and other methacrylate monomers, such as norbornyl methacrylate, can be used, as can methacrylic copolymers which include repeating units from methyl methacrylate and from other copolymerizable monomers. Examples of such homopolymers and copolymers can be found in the aforementioned U.S. Pat. Nos. 4,986,648 and 5,043,405.

Sheets 12 and 14 can each comprise one or more layers. Good results can be obtained using a single sheet for each of respective layers 12 and 14. As shown in FIG. 1, and in the unitary composite blank 26 of FIG. 6, one of the sheets (14 in FIG. 1; and 28 in FIG. 6) has a thickness substantially greater than the other of the pair of light-transmissive sheets. In general, it will be beneficial to employ: a first light-transmissive sheet of thermoplastic material of a first thickness for formation in the shaped optical lens blank 50 of the convex surface of the lens blank; and a second light-transmissive sheet of thermoplastic material (of a second thickness, 3 to 100 times, e.g., 4 to 20 times, the thickness of the first sheet) for formation of the concave surface of the resulting optical lens blank 50. The thick side of a formed lens blank can then be ground to prescription requirements.

Sheet 12 should be a relatively thin sheet having a thickness sufficient to permit the desired incorporation of dyes or other absorbers or additives but not so thick as to increase weight or mass or cause haze. Sheet 12 can, for example, have a thickness of from 5 to 75 mils (0.127 to 1.91 mm.) Good results are obtained, for example, using a first relatively thin sheet of about 30 mils thickness (0.76 mm.) and a second thicker sheet having a thickness of about 280 mils (7.10 mm.), i.e., more than nine times the thickness of the first sheet. According to a preferred embodiment, each of such sheets will comprise extruded poly(methyl methacrylate).

Various additives can be included in the light polarizer 16, or in either or both of light-transmissive sheets 12 and 14. Stabilizers, such as ultraviolet-light absorbers, antioxidants and colorant dyes can be used. Dyes such as gray, yellow, blue or other dyes can be employed to obtain an optical lens of desired density or color, particularly for ophthalmic applications.

Colorant or tint dyes can be incorporated into either of the thermoplastic materials used for production of sheets 12 and 14. Dyes which impart their desired coloration to composite light-polarizing laminate 10 and to the optical lens blanks produced therefrom will preferably be confined to sheet 12. In this manner, optical grinding of the thicker layer (14), and the non-uniform thickness resulting therefrom, will not introduce correspondingly non-uniform coloration and absorbance.

Layers (or sheets) 12 and 14 each comprise a polymeric thermoplastic material which can be formed, molded or shaped to a desired curvature under conditions of heat and pressure. An important functional attribute of each of layers 12 and 14 is the provision of durability to the finished lens blank and to the lens prepared therefrom. Preferably, layers 12 and 14 will comprise polymeric material capable of providing intrinsically, a measure of durability and scratch resistance. In some instances, it will be beneficial to employ sheet materials 12 and/or 14 which carry or can be provided with a suitable polymeric protective coating. The protective coating will be one which can withstand the conditions of the thermoforming step used in shaping the lens blank, without cracking, delamination or other undesirable failure or blemishing effect. A suitable hard and protective coating can be applied, using known polyurethane, polyacrylate or urea-type resins and will be especially beneficial in the case of sheet 12 for the provision in a finished lens of a protective surface 27s, shown in FIG. 11.

In constructing the composite light-polarizing laminate 10 of FIG. 1, it will be important to observe substantial parallelism (alignment) with respect to the absorption axis (line A–A', FIG. 1) of light polarizer 16 and a principal index of refraction of at least sheet 12 of the pair of light-transmissive sheets 12 and 14. From inspection of FIG. 1, there can be observed principal indices of refraction along the lines designated n∥—n∥ and n⊥—n⊥, shown in each of sheets 12 and 14 to refer, respectively, to parallel and perpendicular major indices of refraction. Thus, as shown in the plan view of the laminate 17 of FIG. 3, a principal index of refraction of each of sheets 12 and 14, i.e., the major parallel index of refraction along the machine direction (line n∥—n∥) of each of the sheets, is caused to be aligned with the absorption axis (line A–A') of polarizer 16 laminated between the sheets. Proper orientation can be seen also from FIG. 2 which shows a diagrammatic representation of alignment relationships between the absorption axis of light polarizer 16 and a principal index of refraction of light-transmissive sheet 12.

Figure 2:
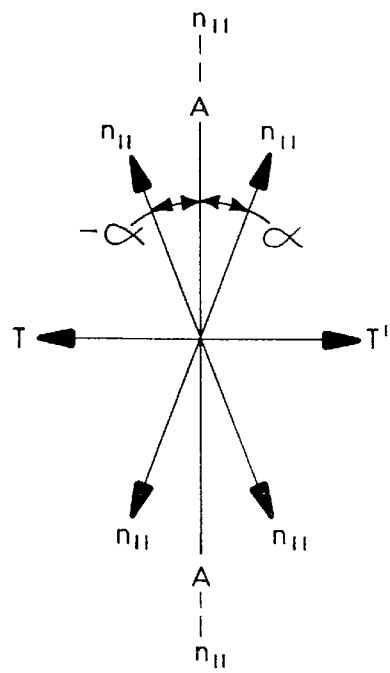
FIG. 2 is a diagrammatic representation of alignment relationships between the absorption axis of the light-polarizer of the composite laminate of FIG. 1 and a principal index of refraction of one of the light-transmissive sheets thereof.

As shown in FIG. 2, a condition of parallelism exists where lines A–A' and n∥–n∥ are coincident upon one another. Such a condition reduces polarization efficiency losses which would occur if the absorption axis of polarizer 16 were not aligned with a major index of refraction of sheet 12.

Figure 3:
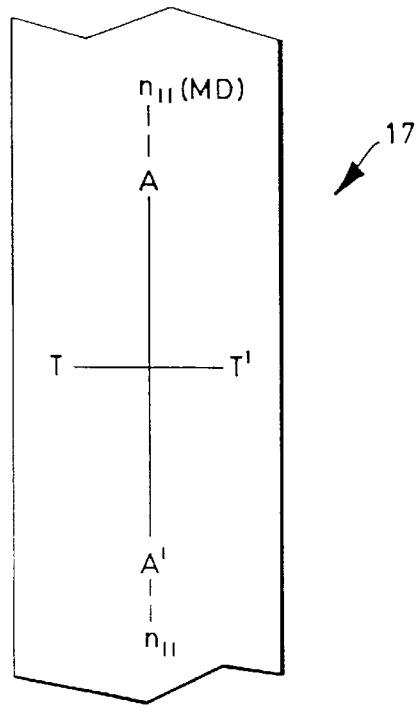
FIG. 3 is a plan view of a preferred laminar composite structure from which a lens blank can be manufactured, showing alignment of the absorption axis of the light polarizer thereof with a principal (parallel) index of refraction of each of a pair of outer light-transmissive sheets.

As pointed out previously, at least sheet 12 will comprise a birefringent polymeric layer, and as a consequence of the birefringence of the layer and its capacity to promote optical retardance, sheet 12 will be caused to be in substantial parallelism with polarizer 16. It is not a requirement that sheet 14 also be a birefringent layer or that it be aligned (or in substantial parallelism with the absorption axis of the polarizer) if it is a birefringent layer. In general, however, it will be convenient to utilize sheets of birefringent material for each of layers 12 and 14 and to thereby realize the cost benefits of mass produced polymeric sheets which typically exhibit a level of birefringence and optical retardation effects. If desired, sheet 14 can comprise an optically isotropic polymer, e.g., a polymer exhibiting an optical retardation of 20 nanometers or less. When a pair of birefringent sheets is employed, it will normally be convenient from a manufacturing standpoint to cause the same major index of refraction of each of sheets 12 and 14 (e.g., the index of refraction along the machine or stretch direction of each of sheets 12 and 14) to be in alignment with the absorption axis (A–A') of polarizer 16, as shown in FIG. 3.

As used herein, a condition of substantial parallelism with respect to alignment of a major index of refraction and the light polarizer absorption axis is considered to exist where the index of refraction of birefringent sheet 12 is within ±three degrees of the absorption axis. As shown in FIG. 2, a major index of refraction of sheet 12 (shown along line $n\|$—$n\|$ in FIG. 2) can form an angle ($\alpha$) of up to three degrees from the absorption axis (A–A') of the light polarizer, while still providing acceptable performance attributes in a lens blank 50 (FIG. 11) of the invention. Similarly, the lines representing, respectively, index of refraction and absorption axis of light-transmitting sheet(s) and polarizer can subtend an angle ($-\alpha$) of up to minus three degrees. In general, it will be preferred that a condition of parallelism be observed, or that an angle less than i one degree be subtended, notwithstanding that deviation in the range of ±about three degrees can be tolerated without unacceptable polarization and efficiency losses.

Lens blanks can be prepared from composite light-polarizing laminate 10 by cutting and removing from a supply of the laminate, unitary portions of a size suited to the production of a desired optical lens. A preferred method of preparing an individual blank to be thermoformed into a lens is shown in FIG. 4 which is a plan view of a section 20 of a thermoformable light-polarizing laminate from which individual units (22 and 23) are cut and removed.

Figure 4:
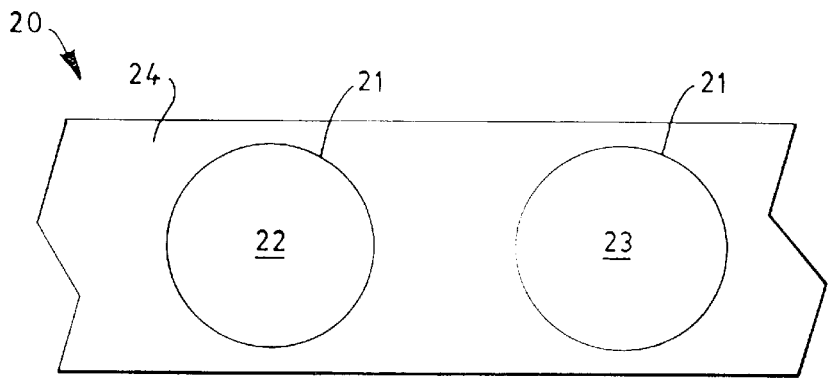
FIG. 4 is a plan view of a section of light-polarizing panel (laminate) showing certain stages in the production therefrom of a unitary portion of the laminate thermoformable to a curved lens blank of the invention.
Figure 5:
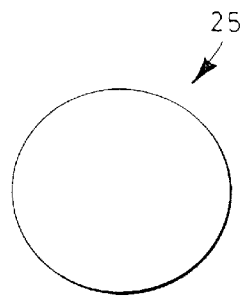
FIG. 5 shows a plan view of a unitary thermoformable portion removed from the section of the laminate of FIG. 4.

Shown in FIG. 4 is a cutting stage in which the thermoformable light-polarizing laminate 20 is provided with a cut 21 to define the perimeter of an individual unit (22 or 23) to be removed from the remainder 24 of the laminate. On cutting completely through the laminate, an individual unit (22 or 23) is defined; and upon removal there is provided a thermoformable blank 25, as shown in FIG. 5. Cut 21 can be made in a number of ways, including by a rolling knife cutter, reciprocal stamping cutter, a straight-edge cutting knife moved translationally along cutline 21, a rotary or swing die traversed along line 21 or by a laser cutter.

A preferred method of cutting unitary portions 22 and 23 from the light-polarizing laminate involves cutting the laminate by directing a laser beam along cutline 21. Sharp and well-defined cutlines can be obtained in this manner. Good results can be realized using a 500-watt or 1000-watt laser of the $CO_2$-type, having a one-millimeter laser beam diameter. Individual light-polarizing laminar blanks, such as blank 25 of FIG. 5, can be thermoformed to lens blanks in a manner described in detail hereinafter. The blanks will, however, be subjected typically to preliminary treatments such as cleaning, grinding or polishing as required. If desired, surface coatings, mold-release agents or other agents can be applied. The blanks can also be preheated to a predetermined temperature (below the temperature of the thermoforming platens) to shorten the time required for the blank to be brought to a thermoforming temperature.

Figure 6:
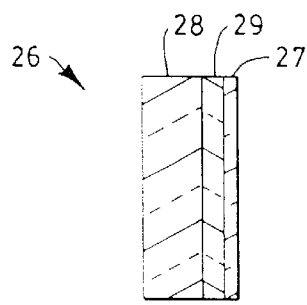
FIG. 6 shows in cross-section the respective layers of a unitary portion of a laminate thermoformable to a curved lens blank of the invention.

As shown in FIG. 6, unitary light-polarizing blank 26, suited for thermoforming into a lens blank comprises the light polarizer 29 between a pair of light-transmissive layers 27 and 28. In the case of the production of an ophthalmic lens therefrom, thermoforming of the blank 26 will define convex and concave surfaces onto layers 27 and 28. The greater thickness of layer 28 relative to layer 27 accommodates the grinding of the shaped lens to provide desired refractive power, especially important in the production of prescriptive ophthalmic lenses.

The unitary laminate 26 shown in FIG. 6 can be produced, and utilized in various manners. Preferably, a composite structure of finite or endless length can be formed by a continuous or semi-continuous method whereby webs or pieces of the thermoplastic sheet material are adhered to the opposed sides of a light-polarizer; and individual blanks are cut to predetermined dimensions suited for the particular forming apparatus employed. They can be heated and placed immediately, or after substantial cooling, into the forming apparatus.

The method by which the unitary light-polarizing laminar blank 26 is formed into a light-polarizing lens which is convex on one side and concave on the other side will be described below in connection with FIGS. 7 through 10.

Figure 7:
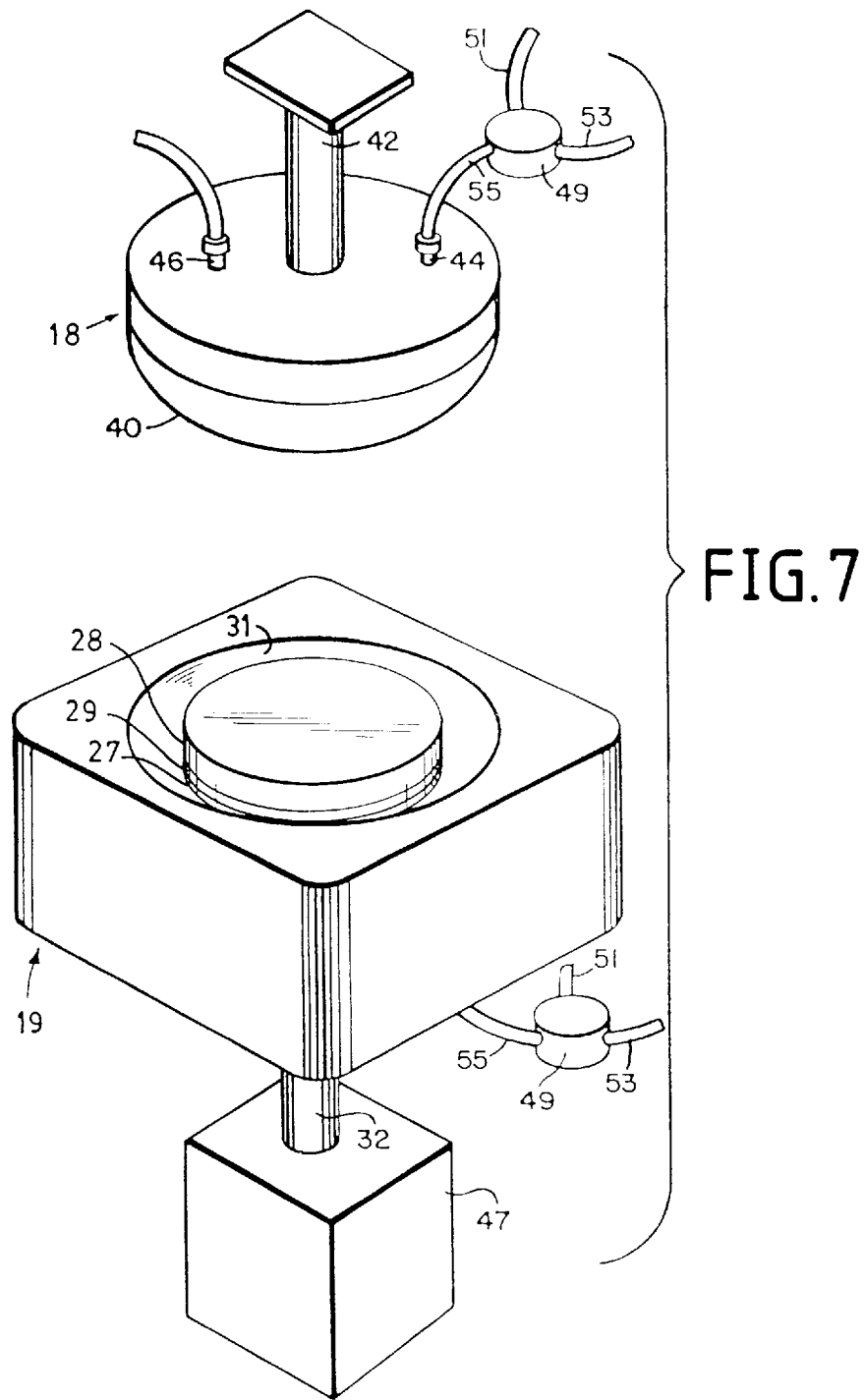
FIG. 7 is an isometric view of one type of press-forming apparatus suitable for forming a curved composite lens blank by the method of the present invention.

The forming process can be carried out by apparatus of the type shown in FIG. 7. The apparatus includes convex platen 18, concave platen 19, means for driving the platens into and out of pressure-applying relationship with each other, and means for alternately heating and cooling the platens during each pressure-applying interval.

Concave platen 19 includes glass member 30 (FIG. 8) having smooth concave forming surface 31, shaft 32 operatively connected to a suitable drive means, fluid chamber 33, fluid inlet coupling 34, and fluid outlet coupling 36.

Convex platen 18 includes glass member 38 (FIG. 8) having convex forming surface 40, fixed support means 42, fluid chamber 43, fluid inlet coupling 44, and fluid outlet coupling 46.

The drive means includes a suitable hydraulic piston and cylinder arrangement 47 operatively connected to platen 19 for moving platen 19 into and out of pressure-applying relationship with platen 18.

The heating and cooling means for both the platens includes three-way valve means 49, heating fluid conduit 51, cooling fluid conduit 53, and fluid inlet 55 connecting one of the three way valves to each of fluid inlet couplings 34 and 44 of platens 19 and 18, respectively.

Figure 8:
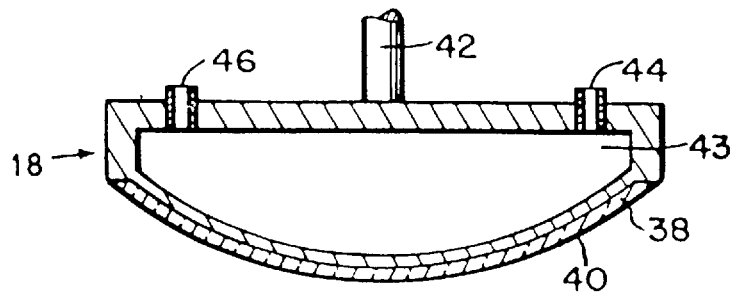
FIG. 8 is a cross-sectional view of the apparatus of FIG. 7, showing the conduct of one step of the method of the invention.
Figure 9:
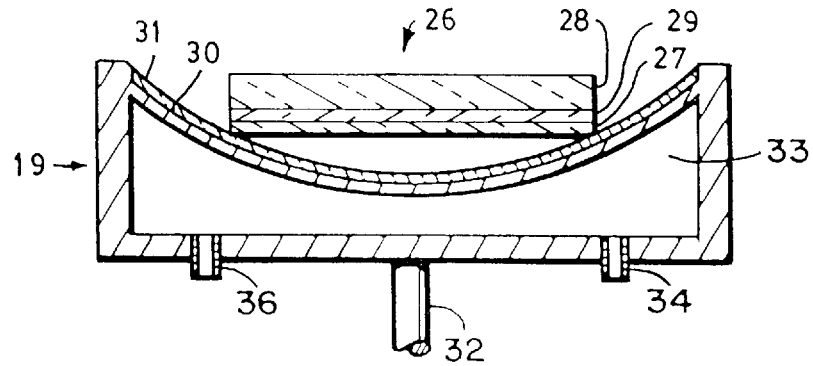
FIG. 9 is a cross-sectional view of the apparatus of FIG. 7, showing the conduct of a heating and pressing step of the method of the invention.
Figure 9:
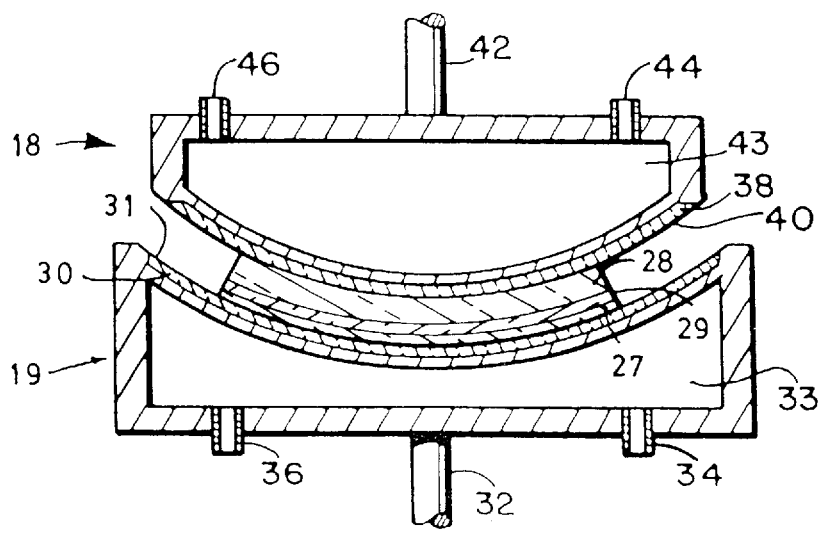

Referring now to FIG. 8, unitary laminar portion 26 is placed in concave platen 19 so that relatively thick sheet 28 faces convex platen 18, thereby locating the light-polarizing layer 29 relatively near the concave platen 19. The concave and convex platens are then moved into pressure-applying relationship, as shown in FIG. 9, to form or shape the unitary laminar portion 26, by the combined effects of pressure and temperature, into a shaped optical lens characterized by concave and convex opposed surfaces.

The amount of pressure applied will vary with the particular nature of the composite structure of laminar portion 26, and especially the nature of the thermoplastic materials of sheets 12 and 14, and with the temperatures of the forming surfaces 30 and 40. In the case of a composite comprising a light polarizer of the preferred type described hereinbefore laminated between sheets of poly(methyl methacrylate), pressures in the range of about 100 to 1000 lbs./in.$^2$ of lens area (7.0 to 70.3 kg./cm$^2$ of lens area) can be suitably employed. A preferred pressure is about 256 lbs./in.$^2$ (about 18.0 kg./cm$^2$).

While pressure is applied to the laminar blank portion 26, in the manner aforesaid, the platens are heated by passing hot water through chambers 33 and 43 of platens 19 and 18, respectively. Surfaces 31 and 40 are continually heated sufficiently to shape the thermoplastic material of sheets 12 and 14 and conform the surfaces of laminar blank 26 to the forming surfaces 31 and 40 of platens 19 and 18. During the forming of a lens blank, conditions of temperature and pressure will be used sufficiently to cause the lens blank to assume the desired shape determined by the platen surfaces and to be annealed, so as to retain its shape and reduce internal stresses which affect polarization efficiency. Such will be especially important in the case of polycarbonate lens blank, and to a lesser extent, in the case of acrylic lens blanks.

The uniform thickness of the laminar blank 26 placed between the platens remains unchanged and there is produced a lens having optical power.

The method of the present invention can be used for the production of finished lenses which are relatively thick and which have, therefore, the durability associated with such thickness. Lenses which vary widely in thickness can be produced. A durable lens having a preferred thickness of from 30 to 400 mils (0.76 to 10.2 mm.) can be produced readily using the method of the invention. Finished lenses can be ground and treated in known manner to provide protective and other functional layers. Antifog layers, metallic layers, organopolysiloxane and other layers can be applied for their known optical, durability and aesthetic effects. Dip, spin-coating, vacuum deposition and like coating methods can be used, appropriate to the particular coating to be applied.

In the production of a light-polarizing lens blank 50 of the invention, it will be convenient to utilize a platen 19 having a forming surface 30 which corresponds at least substantially to, and preferably corresponding precisely to, the predetermined curvature of the convex side of the lens to be formed. This permits the convex side of the thermoformed lens blank to have substantially or precisely the refractive power desired in the finished lens and avoids the need to surface or grind the convex side of the lens blank. Although grinding of the convex side will not be precluded it will be beneficial from a practical standpoint and typical in the case of the inventive lens blanks to select a mold surface appropriate to avoidance of such grinding. It can be appreciated that the convex surface of sheet 27 (formed against forming surface 30) may serve as the outer surface of an ophthalmic sunglass lens. The radius of curvature for surface 30 can vary and can be spherical or aspherical in shape. For the production of a family of lens blanks for ophthalmic lenses, a series of lens blanks can be prepared using platens having various radii of curvature, for example, 2.5, 4, 6 and 9 diopters, respectively.

The radius of curvature of each of platens 18 and 19 which form, respectively, the concave and convex surfaces (28s and 27s) of lens blank 50 can be determined in known manner. Thus, the radius of curvature ($R_2$) of surface 40 of convex platen 18 (which provides concave lens surface 28s of lens blank 50) can be calculated by resort to the formula (V):

$$R_2 = R_1 - t \quad \text{(IV)}$$

wherein $R_1$ is the radius of curvature of surface 30 of concave platen 19 (which provides convex surface 27s of lens blank 50); and t is the thickness of the blank.

Good results can be obtained by using a concave platen 19 having a surface 30 which provides a base curve within a range of, for example, two to ten diopters; and calculating the radius of curvature ($R_2$) for surface 40 of convex platen 18, as aforedescribed. For example, in the case of a lens blank 50 having a surface 27s of 6.25 diopters, a refractive index of 1.492 and a thickness of 0.137 in. (3.48 mm), the radius of curvature ($R_1$) of concave platen 19 is calculated using the formula (V):

$$R_2 = \frac{n-1}{P} \quad \text{(V)}$$

wherein P is the base curve of the lens in diopters. The calculated value of $R_1$ (3.099 in; 0.079 m) is then used to calculate, using Formula IV, the radius of ($R_2$) of surface 40 of convex platen 18, i.e., a radius of curvature of 2.782 in. (0.071 mm).

The requisite temperature for forming (shaping) the unitary laminar blank 26 will vary with the chemical composition of the thermoplastic sheets 12 and 14. In general, the thermoforming temperature range for materials of, for example, the polycarbonate class will be between 300° F. and 450° F. (177° C. to 232° C.), while it will be lower for acrylic materials. Using polymethyl methacrylate sheets, molding temperatures of from about 200° to 450° F. (93.3° to 232° C.) provide good results. A preferred molding temperature is about 300° F. (177° C.). Oftentimes it will be beneficial to preheat the blank, for example, in the case of poly(methylmethacrylate) sheets, to a temperature of 160° to 230° F. (71°–110° C.) for 10 to 30 minutes. Other pretreatments can also be used, depending upon the structural laminate to be thermoformed.

The temperature of the forming surfaces of the platens can be controlled by the passage of heated water and cooled water, as described previously. The platens preferably will be preheated, i.e., prior to placement of the unitary laminar blank 26 therebetween, and will be heated to the requisite forming temperature for a heating cycle sufficient to provide the desired shaped lens. For example, the forming surfaces of the platens can be preheated to about 100°–400° F. (38°–204° C.) in the case of polymethyl methacrylate thermoplastic materials, in advance of placing the composite laminate into the mold and closing the mold within about 5 to 30 seconds. The mold surfaces are then heated to the requisite forming temperature by the passage of heated water through the platens and temperature is maintained for a duration (e.g., 60 to 240 seconds) sufficient to effect desired lens formation. Thereafter, the temperature of surfaces 31 and 40 is reduced by passage of a cooling fluid, such as relatively cool water, through chambers 33 and 43 of the platens. The cooling fluid is passed through the platens for a duration, e.g., for about 30 seconds.

Hot water is supplied to the platens through conduits 51 and the relatively cool water is supplied through conduits 53. During the heating cycle, valve 49 opens a connecting passage between conduit 51 and inlet 55 and closes conduit 53; oppositely, during the cooling cycle, the valve opens a connecting passage between conduit 53 and inlet 55 and closes conduit 51. The transition from the heating cycle to the cooling cycle is carried out by operating valves 49 to mix cool water with the hot water until the hot water is completely displaced by cool water. Transition from cooling cycle to heating is carried out by reversing the operation.

After the cooling operation, platens 18 and 19 are separated to relieve the pressure on laminar blank 26 and permit its removal, as shown in FIG. 10. The laminar blank may adhere to one of the platens, from which it may be removed by a stream of compressed air supplied by air nozzle 48, or by physical means.

FIG. 11 illustrates a formed light-polarizing lens, 50, concave on the side formed by convex platen 18 and convex on the side formed by concave platen 19. Using the apparatus shown in FIG. 7 and the conditions herein described, light-polarizing lens blanks exhibit good durability can be provided. Other apparatus can, however, be employed and variations in process conditions, such as heating and cooling cycles, can be used to advantage, depending upon the particular materials used for the production of composite laminate 10. Optical lens blanks can be formed rapidly, for example, within about 130 seconds between loading a unitary composite blank 26 into the platens and removing the shaped lens blank 50. The method of the present invention, thus, provides a simple and effective means of satisfying the objectives of producing relatively thick, light-polarizing shaped lenses exhibiting good durability.

The following example illustrates the invention but is not to be taken as limiting the invention.

EXAMPLE

Optical lens blanks were manufactured in the following manner.

A plastic 24 in.×18 in.×0.317 in. (61.9 cm.×45.7 cm.×0.81 cm.) light-polarizing panel was prepared by laminating between a pair of pressure rollers, an assemblage of the following components in the stated order, with optically clear acrylate-type adhesive between the components:

(1) a sheet of birefringent uniaxially oriented (extruded) polymethylmethacrylate containing colorant dye and ultraviolet light absorber and having a thickness of 0.030 in. (0.76 mm.);

(2) a light polarizer sandwich comprising a one-mil (0.025 mm.) thick iodine-stained and borated polyvinyl alcohol layer having an absorption of 38%, sandwiched between a pair of clear cellulose triacetate sheets, each of 0.003 in. (0.076 mm.) thickness; and (3) a clear sheet of birefringent uniaxially oriented (extruded) poly(methylmethacrylate) having a thickness of 0.280 in. (7.1 mm.).

The components of the panel, prior to the aforementioned pressure lamination, were assembled such that the absorption axis (along the machine direction) of the light polarizer was aligned within one degree of the major index of refraction (along the machine direction) of each of the acrylic sheets on opposed sides of the polarizer. The resulting laminate (panel) retained the polarization properties of the polarizer component.

Flat discs (having diameters of 60, 65, 70 and 75 mm.) were cut out of the panel using a 500-watt $CO_2$-type laser having a one millimeter beam diameter. The resulting discs were cleaned, dried and preheated for 20 minutes at 212° F. (100° C.). Without cooling the pre-heated discs, they were placed in each case in a thermoforming apparatus having a pair of platens with optically polished glass mold surfaces, convex and concave, respectively. The platen surfaces were of spherical and aspherical shapes and of various curvatures, including 2.5, 4, 6 and 9 diopters. In each instance, the disc was placed between the convex and concave mold surfaces such that the thin acrylic side of the disc faced the concave mold surface and the thick acrylic side faced the convex mold surface. The respective convex and concave platens were brought together under the pressure of 150 psi (17.6 kg. $cm^2$), for 110 seconds, and were further heated to 320° F. (160° C.). While maintaining the pressure, the platens were cooled for 30 seconds to 80° F. (26.7° C.). The platens were then separated and the formed lens blanks were removed. The result was a series of convexoconcave lens blanks, the convex surface of each being 2.5, 4, 6 or 9 diopters, and the rear surface of each blank being grindable to a specified curvature to meet a required prescription. The convex surface can be improved by a scratch-resistant coating applied by a spin-coating method.

Since certain changes may be made in the above product and method without departing from the scope of the invention herein involved, it is intended that all matter contained in the above description or shown in the accompanying drawings shall be interpreted as illustrative and not in a limiting sense.

What is claimed is:

1. A unitary laminar curved composite lens blank for the production of a light-polarizing optical lens, the lens blank comprising in order:

a first light-transmissive birefringent polymeric layer;

a light-polarizing layer;

and a second light-transmissive polymeric layer;

said first light-transmissive birefringent layer defining a convex surface of said lens blank and being a thin layer relative to said second light-transmissive layer;

said second light-transmissive layer defining a concave surface of the lens blank and being substantially thicker than the first light-transmissive layer and having a thickness sufficient to permit grinding of the concave surface thereof for production of optical properties desired in said light-polarizing optical lens;

said convex surface of said unitary laminar curved composite lens blank providing at least substantially the optical properties desired in said light-polarizing optical lens and said concave surface thereof being grindable to a surface providing said light-polarizing optical lens with said desired optical properties;

said light-polarizing layer and at least the first of said first and second light-transmissive layers being aligned such that a principal index of refraction direction of the light-transmissive layer is in substantial parallelism with a light absorption axis of the light-polarizing layer.

2. The lens blank of claim 1 wherein said first light-transmissive birefringent polymeric layer is a uniaxially stretched polymeric sheet material exhibiting a major index of refraction along the uniaxial stretch direction.

3. The lens blank of claim 2 wherein said stretch direction of said first light-transmissive birefringent polymeric layer is in substantial alignment with said absorption axis of said light-polarizing layer.

4. The lens blank of claim 3 wherein said stretch direction and said absorption axis of said light-polarizing layer subtend an angle of ±one degree.

5. The lens blank of claim 3 wherein each of said first and second light-transmissive polymeric layers is a uniaxially stretched birefringent polymeric sheet exhibiting a major index of refraction along the stretch direction.

6. The lens blank of claim 5 wherein each of said first and second light-transmissive birefringent polymeric sheets comprises an acrylic polymer.

7. The lens blank of claim 6 wherein each of said sheets of acrylic polymer comprises an extruded poly (methylmethacrylate) sheet.

8. The lens blank of claim 2 wherein said light-polarizing layer comprises a sheet of polyvinyl alcohol stained with a dichroic dye or a sheet of polyvinyl alcohol containing polyvinylene light-polarizing species.

9. The lens blank of claim 2 wherein said first light-transmissive polymeric layer has a thickness in the range of 0.127 mm. to 1.91 mm. and said second light-transmissive polymeric layer has a thickness from 3 to 100 times the thickness of said first light-transmissive polymeric layer.

10. A method of preparing a curved optical lens blank which comprises the steps of:

prov180ing a supply of a composite light-polarizing laminate, said laminate comprising, in order and in superposed relation, a first light-transmissive birefringent polymeric layer, a light-polarizing layer, and a second light-transmissive polymeric layer, said first light-transmissive layer being a thin layer relative to said second light-transmissive layer, said second light-transmissive layer being substantially thicker than said first light-transmissive layer and having a thickness sufficient to permit the grinding of material therefrom in the optical grinding of a concave surface of a lens to be formed from said laminar composite structure, said light-polarizing layer and at least the first of said first and second light-transmissive layers being aligned such that a principal index of refraction direction of the light-transmissive layer is in substantial parallelism with a light-absorption axis of the light-polarizing layer;

cutting and removing from said supply of said light-polarizing laminate, a unitary portion of a size sufficient for the production therefrom of a curved lens;

placing said unitary portion between opposed concave and convex platens, with the first light-transmissive layer of said portion positioned for shaping by said concave platen;

heating and pressing said platens together, said pressing being sufficient to shape said unitary portion into a curved lens having a convex surface defined by the first light-transmissive layer thereof, and a concave surface defined by the second light-transmissive layer thereof, each said surface having a radius of curvature corresponding substantially to the radius of curvature of the respective platen forming said surface; and removing the resulting curved lens from between said platens.

11. The method of claim 10 wherein said first light-transmissive birefringent polymeric layer is a uniaxially stretched polymeric sheet material exhibiting a major index of refraction along the uniaxial stretch direction.

12. The method of claim 11 wherein said stretch direction of said first light-transmissive birefringent polymeric layer is in substantial alignment with said absorption axis of said light-polarizing layer.

13. The method of claim 12 wherein said stretch direction and said absorption axis of said light-polarizing layer subtend an angle of less than ±one degree.

14. The method of claim 11 wherein each of said first and second light-transmissive polymeric layers is a uniaxially stretched birefringent polymeric sheet exhibiting a major index of refraction along the stretch direction.

15. The method of claim 14 wherein each of said first and second light-transmissive birefringent polymeric sheets comprises an acrylic polymer.

16. The method of claim 15 wherein said acrylic polymer comprises polymethylmethacrylate.

17. The method of claim 11 wherein said light-polarizing layer comprises a sheet of polyvinyl alcohol stained with a dichroic dye or a sheet of polyvinyl alcohol containing polyvinylene light-polarizing species.

18. The method of claim 11 wherein said first light-transmissive polymeric layer has a thickness in the range of 0.025 mm. to 1.91 mm. and said second light-transmissive polymeric layer has a thickness from 3 to 100 times the thickness of said first light-transmissive polymeric layer.

19. The method of claim 11 comprising the step of grinding said concave surface defined by said second light-transmissive layer to an ophthalmic prescription.

20. A method of preparing a series of lens blanks for the production of prescription ophthalmic lenses therefrom which comprises the steps of:

providing a supply of a composite light-polarizing laminate, said laminate comprising, in order and in superposed relation, a first light-transmissive birefringent polymeric layer, a light-polarizing layer, and a second light-transmissive polymeric layer, said first light-transmissive layer being a thin layer relative to said second light-transmissive layer, said second light-transmissive layer being substantially thicker than said first light-transmissive layer and having a thickness sufficient to permit the grinding of material therefrom in the optical grinding of a concave surface of a lens to be formed from said laminar composite structure, said light-polarizing layer and at least the first of said first and second light-transmissive layers being aligned such that a principal index of refraction direction of the light-transmissive layer is in substantial parallelism with a light-absorption axis of the light-polarizing layer;

cutting and removing from said supply of said light-polarizing laminate, a unitary lens-blank of a size sufficient for the production therefrom of a curved lens;

placing said unitary portion between opposed concave and convex platens, with the first light-transmissive layer of said portion positioned for shaping by said concave platen to a first convex lens surface having a refractive power in the range of from two to ten diopters;

heating and pressing said platens together, said pressing being sufficient to shape said first unitary portion into a curved lens having said first convex lens surface and a concave surface defined by the second light-transmissive layer thereof, each said surface having a radius of curvature corresponding substantially to the radius of curvature of the respective platen forming said surface;

removing the resulting curved lens blank from between said platens; and repeating each of said placing, heating-and-pressing and removing steps, using a series of concave platens for the shaping of unitary portions to each of a series of convex lens surfaces, each such surface having a different one of the remaining said refractive powers within said range of refractive powers; thereby to provide a series of lens blanks, each of which, has a convex lens surface within said range.

* * * * *